(12) United States Patent
Xu et al.

(10) Patent No.: US 12,237,794 B2
(45) Date of Patent: Feb. 25, 2025

(54) METHOD FOR PROTECTING MOTOR FROM OVERHEATING

(71) Applicant: Zhongshan Broad-Ocean Motor Co., Ltd., Zhongshan (CN)

(72) Inventors: Xiaosan Xu, Zhongshan (CN); Hairong Sun, Zhongshan (CN); Wei Lei, Zhongshan (CN); Jie Zhang, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 168 days.

(21) Appl. No.: 18/097,191

(22) Filed: Jan. 13, 2023

(65) Prior Publication Data

US 2023/0412111 A1 Dec. 21, 2023

(30) Foreign Application Priority Data

May 30, 2022 (CN) .......................... 202210595502.8

(51) Int. Cl.
*H02P 29/032* (2016.01)
*H02H 7/085* (2006.01)
(Continued)

(52) U.S. Cl.
CPC ........... *H02P 29/60* (2016.02); *H02H 7/0852* (2013.01); *H02H 7/0811* (2013.01)

(58) Field of Classification Search
CPC ..... H02P 29/60; H02P 29/032; H02H 7/0852; H02H 7/0811; Y02T 10/64
(Continued)

(56) References Cited

U.S. PATENT DOCUMENTS 10,690,130 B2* 6/2020 Takeuchi ................ F04B 41/02
2011/0101904 A1* 5/2011 Sakamoto .............. H02P 29/64
318/473

(Continued)

FOREIGN PATENT DOCUMENTS

CA 2714936 A1 5/2011
CN 103490385 A 1/2014
(Continued)

OTHER PUBLICATIONS

R. F. Horrell et al, Induction Motor Speed-Torque-Current Curves with a Constant Rotor Temperature, Transactions of the American Institute of Electrical Engineers. Part III: Power Apparatus and Systems, Jun. 1957, pp. 343-347, IEEE, New Jersey, United States.
(Continued)

*Primary Examiner* — Gabriel Agared
(74) *Attorney, Agent, or Firm* — MATTHIAS SCHOLL P.C.; Matthias Scholl

(57) ABSTRACT

A method for protecting a motor from overheating, includes: running a motor in a given parameter P and detecting a real-time temperature R of the motor; comparing the real-time temperature R with a plurality of set temperatures, the plurality of set temperatures including an overheating protection temperature Rm, shutdown temperature Rmax and recovery operation temperature Rmin, Rmin<Rm<Rmax; according to a comparison result, controlling the motor to operate at an initial current value I0, or operate in a reduced current value with respect to the initial current value I0, or stop running; and when the real-time temperature R meets the condition: Rm<R<Rmax, running the motor in an overheating protection mode, where the motor operates in a current value I lower than the initial current value I0, and the current value I decreases with the increase of the real-time temperature R.

10 Claims, 6 Drawing Sheets

Figure 1:
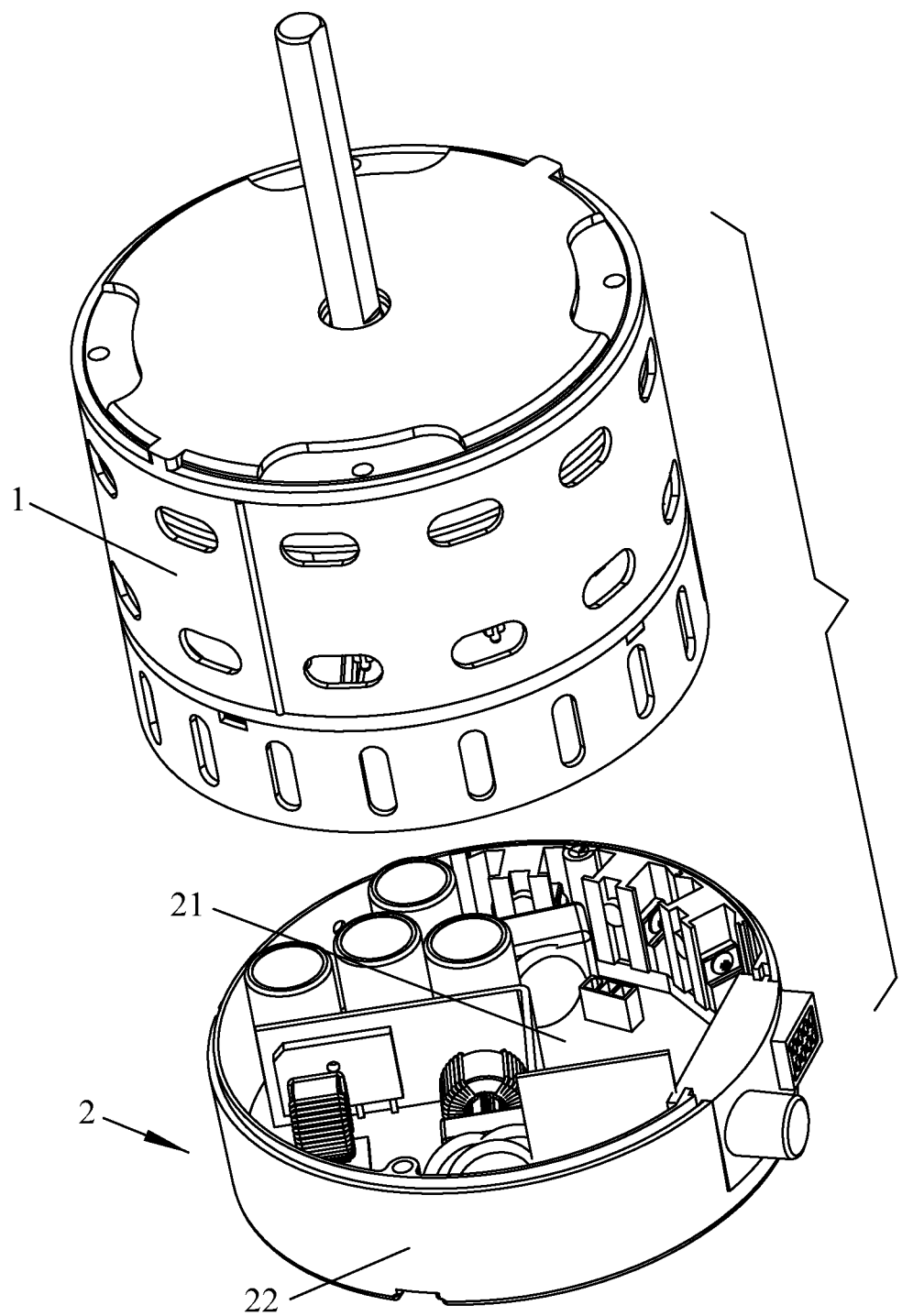

(51) Int. Cl.
*H02P 29/60* (2016.01)
*H02H 7/08* (2006.01)

(58) Field of Classification Search
USPC .......................................................... 318/473
See application file for complete search history.

(56) References Cited

U.S. PATENT DOCUMENTS

2016/0134226 A1* 5/2016 Najima ................. H02P 29/032
  318/472
2018/0167019 A1* 6/2018 Endoh .................. B62D 5/0496

FOREIGN PATENT DOCUMENTS

| | | |
|---|---|---|
| CN | 104129426 A | 11/2014 |
| CN | 109412500 A | 3/2019 |
| CN | 111245323 A | 6/2020 |
| CN | 112018955 A | 12/2020 |
| JP | 2021019491 A | 2/2021 |
| TW | 201143245 A | 12/2011 |
| WO | 2018103047 A1 | 6/2018 |

OTHER PUBLICATIONS

Wei Ding et al, Analysis of common fault causes of three-phase motors and countermeasures, China Metal Bulletin, Apr. 2019, pp. 100-101, China Non-Ferrous Metals Industry Association, Beijing, China.

* cited by examiner

METHOD FOR PROTECTING MOTOR FROM OVERHEATING

CROSS-REFERENCE TO RELATED APPLICATIONS

Pursuant to 35 U.S.C. § 119 and the Paris Convention Treaty, this application claims foreign priority to Chinese Patent Application No. 202210595502.8 filed May 30, 2022, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a method for protecting a motor from overheating.

Conventional DC motors include a motor body and a motor controller. The motor controller is equipped with a variety of electronic components. During the operation of the motors, the electronic components generate heat, and thus cause the temperature of the DC motors to rise. To prevent the electronic components of the motor controller from being damaged by high temperature, the DC motors are usually designed with an over temperature protection function.

Specifically, when the temperature of the motor reaches a protection point, the motor stops running. When the temperature of the motor drops to a workable temperature range, the motor restarts. The over temperature protection scheme has the disadvantage that the motor cannot work in the over temperature protection period, and thus the related products cannot be used. In some applications, the motor needs to run continuously. If the over temperature protection scheme is adopted, the motor will shut down intermittently, bringing bad user experience.

SUMMARY

The disclosure provides a method for protecting a motor from overheating, and the method comprises:
1) running a motor in a given parameter P and detecting a real-time temperature R of the motor;
2) comparing the real-time temperature R with a plurality of set temperatures, the plurality of set temperatures comprising an overheating protection temperature Rm, shutdown temperature Rmax and recovery operation temperature Rmin, Rmin<Rm<Rmax;
3) according to a comparison result in 2), controlling the motor to operate at an initial current value I0, or operate in a reduced current value with respect to the initial current value I0, or stop running; and
4) when the real-time temperature R meets the condition: Rm<R<Rmax, running the motor in an overheating protection mode, where the motor operates in a current value I lower than the initial current value I0, and the current value I decreases with the increase of the real-time temperature R.

In a class of this embodiment, in the overheating protection mode, the current value I varies with the increase of the real-time temperature R according to the following equation: $I=I0(1-((R-Rm)/K))$, where K is a proportional constant in the range between $1.5\times(Rmax-Rm)$ and $2\times(Rmax-Rm)$.

In a class of this embodiment, in the overheating protection mode, when the real-time temperature R starts to decrease rather than increase, the current value no longer decreases, and the motor continues operation with the current value; when the real-time temperature R decreases to the recovery operation temperature Rmin, the motor quits the overheating protection mode, the current value recovers to the initial current value I0, and the motor runs under the given parameter P.

In a class of this embodiment, in the overheating protection mode, the current value I is updated every a set interval T according to the real-time temperature R of the motor; when a temperature R0 corresponding to a last updated current value I is larger than an immediate real-time temperature R, and R0−R>A, where A is a set constant, which means the motor enters a cooling state, and the motor continues operation at the last updated current value I corresponding to the temperature R0 of the motor.

In a class of this embodiment, when the real-time temperature R meets the condition: Rmin<R<Rm, a working mode of the motor is determined; when the motor runs in an overheating protection mode, the current value of the motor continues decreasing; when the motor runs in a shutdown model, the motor stops running until the real-time temperature R decreases to the recovery operation temperature Rmin, and the motor restarts.

In a class of this embodiment, when the real-time temperature R is greater than or equal to the shutdown temperature Rmax, the motor enters the shutdown model and stops running.

In a class of this embodiment, when the motor stops running, the motor cools down continuously with the time passing by, and the real-time temperature R of the motor decreases continuously, until to the recovery operation temperature Rmin, the current value recovers to the initial current value I0, and the motor restarts to run under the given parameter P.

In a class of this embodiment, at initial startup, when the real-time temperature R is less than the overheating protection temperature Rm, the motor operates normally with the initial current value I0.

In a class of this embodiment, 1) when the motor starts, if the real-time temperature is R<Rmin or R<Rm, the motor runs in the initial current value I0;
2) during running, if the real-time temperature is Rm<R<Rmax, the motor enters the overheating protection mode, and runs in a current value I lower than the initial current value I0, and the current value I decreases with the increase of the real-time temperature R;
3) during running, if the real-time temperature is R>Rmax, the motor stops running until the real-time temperature R decreases to the recovery operation temperature Rmin, and the motor restarts running under the initial current value I0 in the given parameter P;
4) during running, if the real-time temperature is Rmin<R<Rm, determining whether the motor runs in an overheating protection mode, if so, the current value continues decrease, if not, to proceed 5); and
5) determining whether the motor is in a shutdown model, if so, allowing the motor to continue resting until the real-time temperature R decreases to the recovery operation temperature Rmin, and then the motor restarts; if not, allowing the motor to run in the initial current value I0.

In a class of this embodiment, the given parameter P is speed or torque or power.

In a class of this embodiment, the motor comprises a motor body, a motor controller, and a temperature detection unit; the motor body comprises a stator assembly and a rotor assembly; the motor controller comprises a control circuit board; the control circuit board comprises a power supply circuit, a motor microprocessor MCU, and an inverter circuit; the power supply circuit supplies power for all circuits, and the motor microprocessor MCU controls the inverter circuit; the inverter circuit controls power on and power off of a coil winding of each phase of the stator assembly thus controlling the motor body; the temperature detection unit is used to detect the real-time temperature R inside the motor body and transmit a detection result to the motor microprocessor MCU; the motor microprocessor MCU compares the real-time temperature R with the plurality of set temperatures so that the motor determines to operate normally with the initial current value I0, or operate in a reduced current value with respect to the initial current value I0, or stop running according to the comparison result.

The following advantages are associated with the method for protecting a motor from overheating of the disclosure:

1) In the overheating protection mode, the motor operates in a reduced current value. By reducing the current value of the motor, the heat loss of the motor is reduced so as to cool the motor. This prevents the motor from directly stopping when the temperature of the motor reaches the temperature protection point, so that the motor can still work under the overheating protection mode. Thus, the motor can be applied to a variety of environments, especially where the continuous operation of the motor is required, thereby improving the use flexibility of the motor, facilitating the use in different occasions, improving the application range of the motor.

2) The motor operates with a current value until the real-time temperature R decreases to the recovery operation temperature Rmin; and then the motor quits the overheating protection mode, the current value recovers to the initial current value I0, and the motor runs under the given parameter P. This can effectively control the temperature rise of the motor, thus improving the service life of the motor in harsh environments, and can also prevent the motor from running at low power all the time, thus achieving the intelligent control of the motor.

3) The real-time temperature R of the motor is directly detected, and the current value of the motor is adjusted in real time through the change of the real-time temperature R, which can accurately achieve the overheating protection of the motor, and the motor can continue to operate under the overheating protection mode. The control method can avoid repeated starting and stopping of the motor near the temperature protection point, so as to better protect the motor and extend its service life.

DETAILED DESCRIPTION OF THE DRAWINGS

Figure 2:
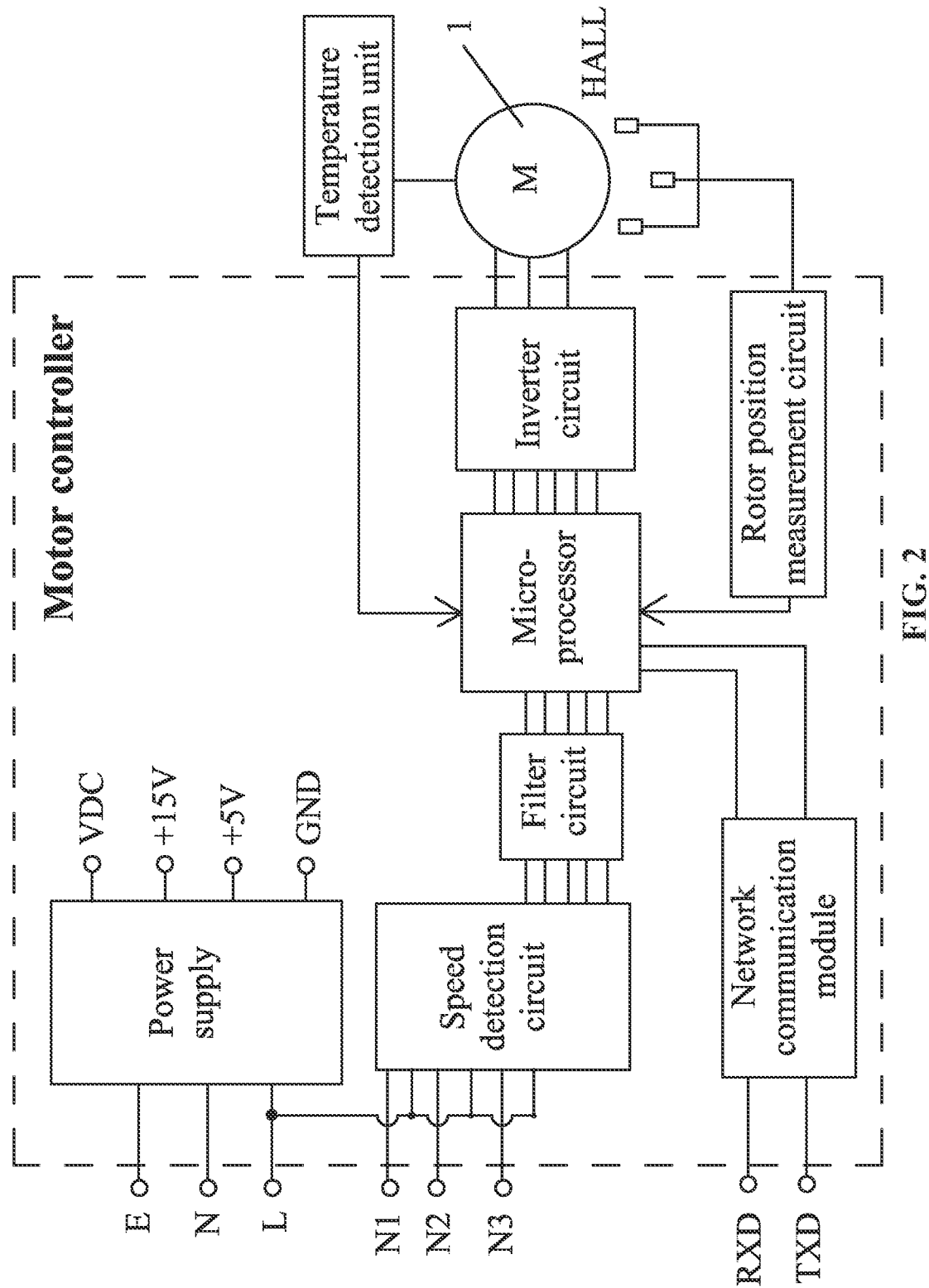
Figure 3:
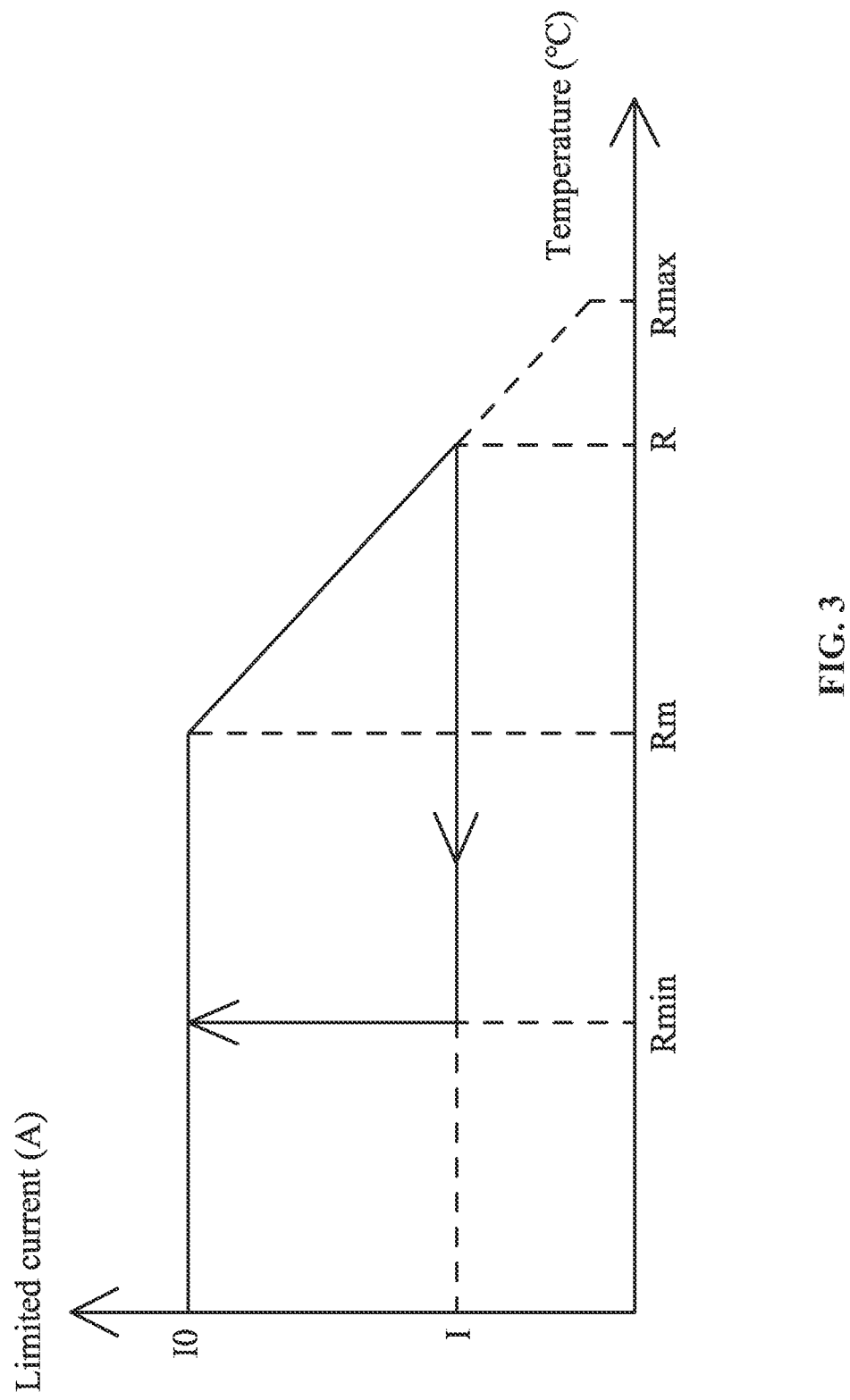
Figure 4:
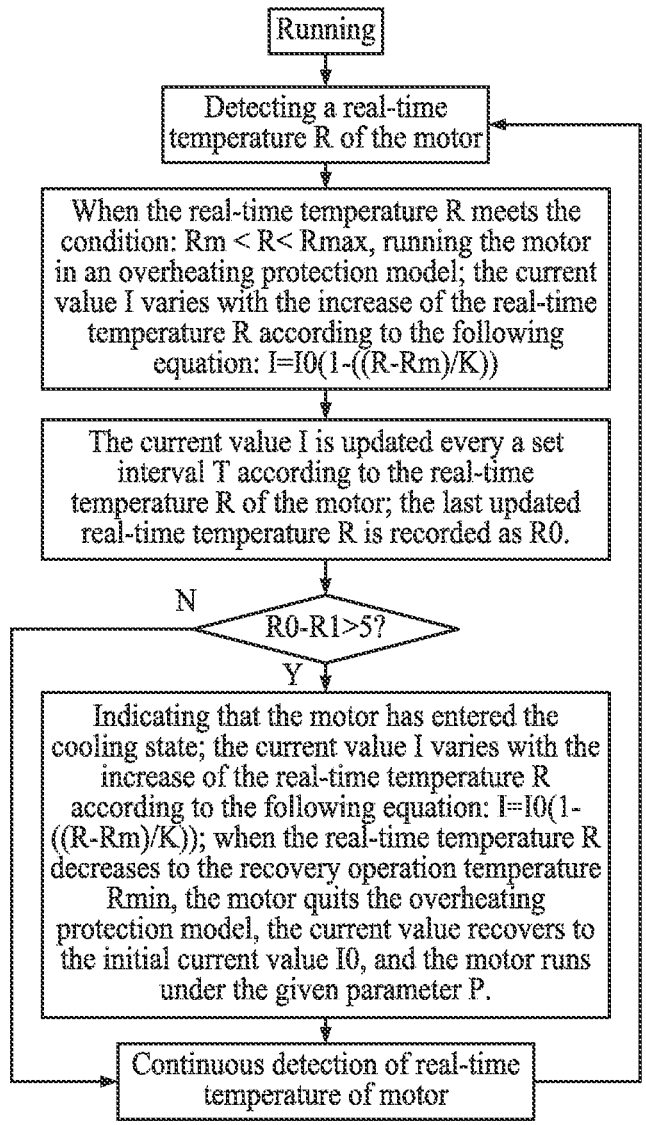
Figure 5:
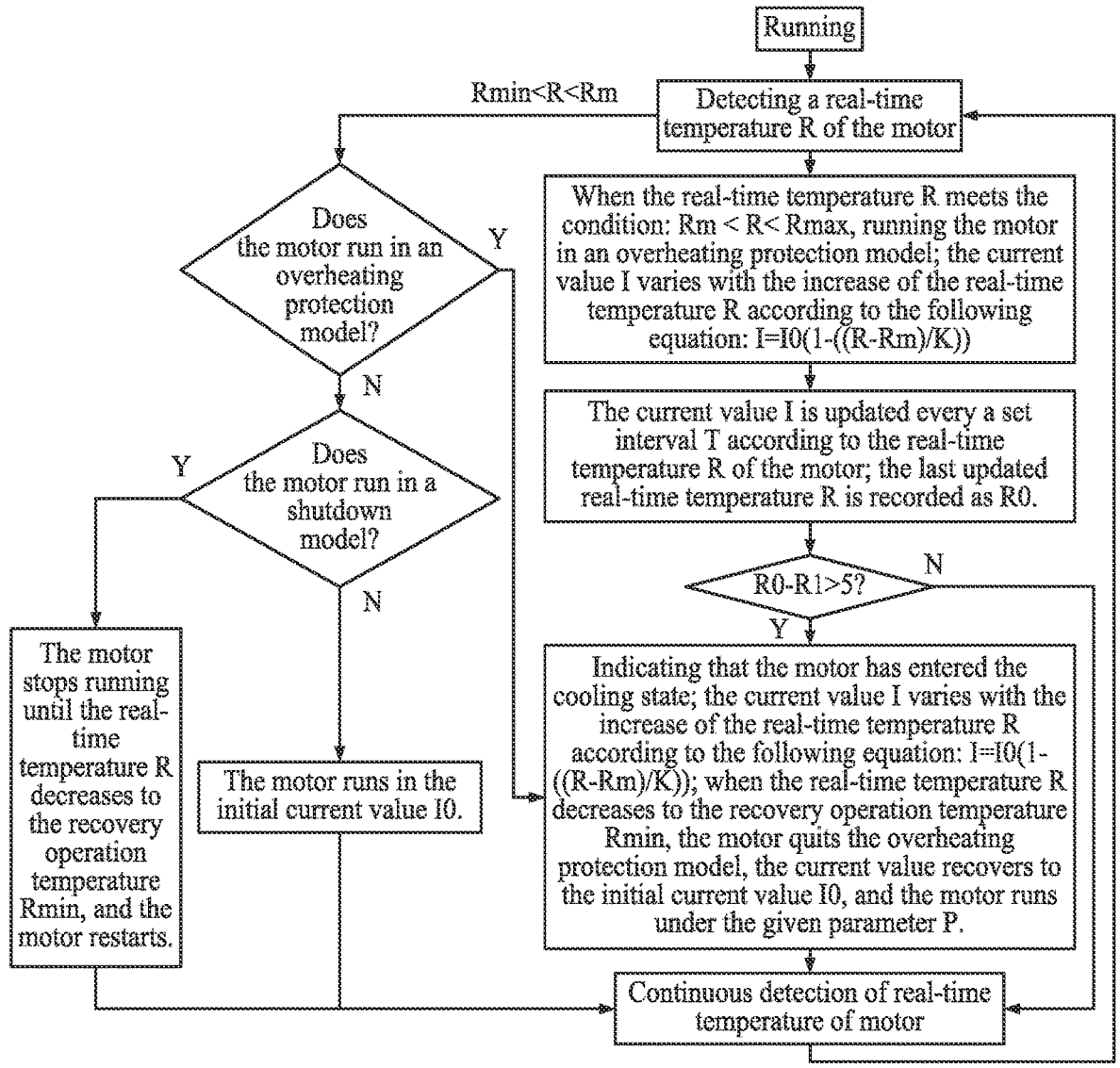
Figure 6:
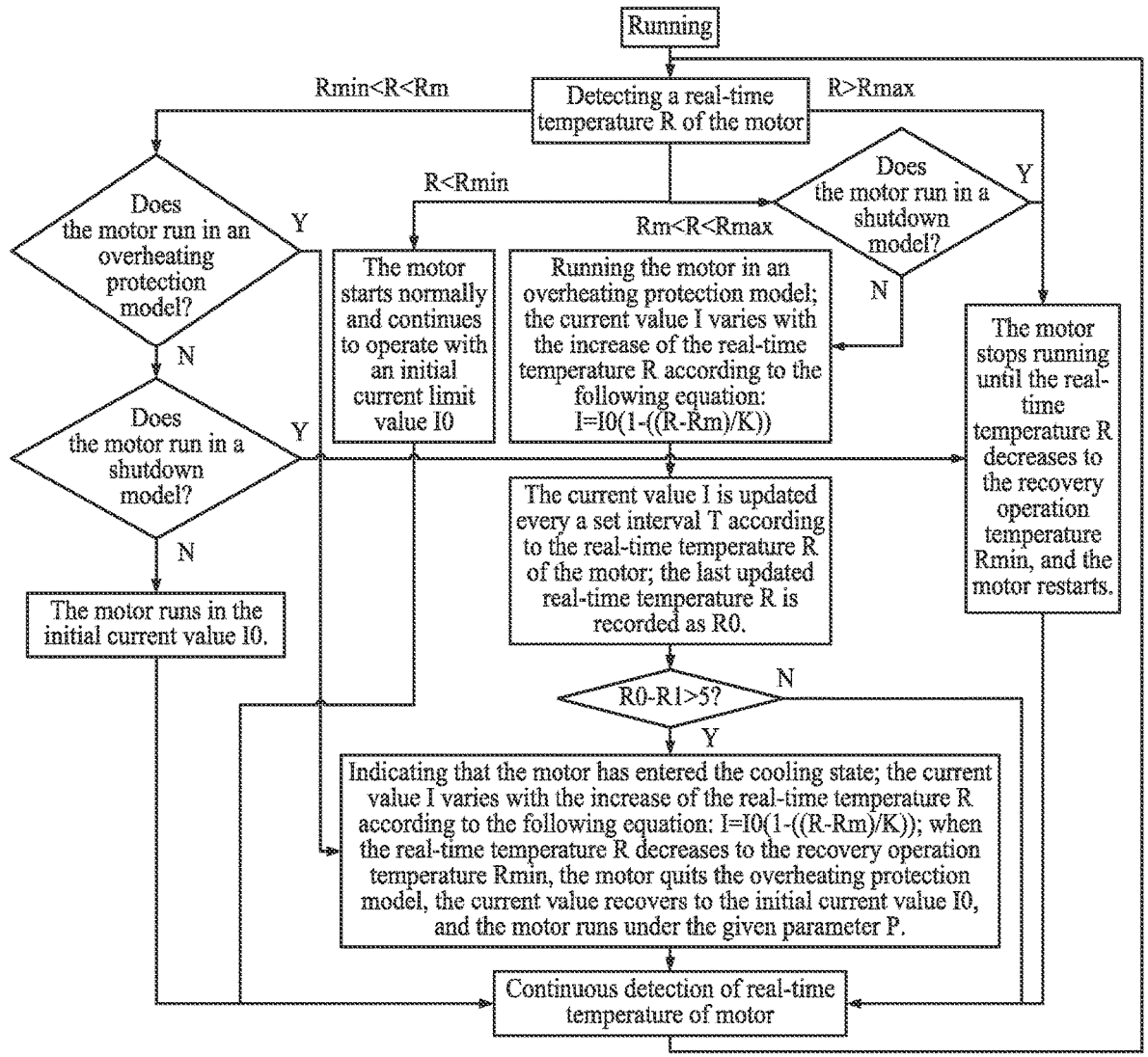

FIG. 1 is a schematic diagram of a motor of the disclosure;
FIG. 2 is a circuit structural diagram of a motor of the disclosure;
FIG. 3 is a principle diagram of an overheating protection method for a motor of the disclosure;
FIG. 4 is a logic block diagram of an overheating protection mode of a method for protecting a motor from overheating of the disclosure;
FIG. 5 is a further logic block diagram of FIG. 4 plus a low temperature operation state; and
FIG. 6 is a generic logic block diagram of an overheating protection method for a motor of the disclosure.

DETAILED DESCRIPTION

To further illustrate the disclosure, embodiments detailing a method for protecting a motor from overheating are described below. It should be noted that the following embodiments are intended to describe and not to limit the disclosure.

As shown in FIGS. 1 and 2, the disclosure provides a motor comprising a motor body 1, a motor controller 2, and a temperature detection unit; the motor body 1 comprises a stator assembly and a rotor assembly; the rotor assembly is disposed in or outside the stator assembly; the motor controller 2 comprises control box 22 and a control circuit board 21 disposed in the control box 22; the control circuit board 21 comprises a power supply circuit, a motor microprocessor MCU, an inverter circuit, and a position detection circuit (i.e. Hall sensor). The power supply circuit supplies power for all circuits, and the motor microprocessor MCU controls the inverter circuit; the inverter circuit controls the power on and power off of a coil winding of each phase of the stator assembly thus controlling the motor body. The position detection circuit (i.e. Hall sensor) is used to transmit the real-time operating parameters (i.e. rotor position information) of the motor body to the motor microprocessor MCU. The temperature detection unit is used to detect the real-time temperature R inside the motor body and transmit a detection result to the motor microprocessor MCU; the motor microprocessor MCU processes the detection result and gives corresponding instructions to control the motor body.

As shown in FIGS. 3-6, the disclosure also provides a method of overheating protection for the motor. The method comprises: running the motor in a given parameter P and detecting a real-time temperature R of the motor; comparing the real-time temperature R with a plurality of set temperatures, the plurality of set temperatures comprising an overheating protection temperature Rm, shutdown temperature Rmax and recovery operation temperature Rmin, Rmin<Rm<Rmax; according to a comparison result, controlling the motor to operate at an initial current value I0, or operate in a reduced current value with respect to the initial current value I0, or stop running; and when the real-time temperature R meets the condition: Rm<R<Rmax, the motor runs in an overheating protection mode, where the motor operates in a current value I lower than the initial current value I0, and the current value I decreases with the increase of the real-time temperature R.

The disclosure provides three control modes, which is convenient to expand the application scope of the motor, improve the use flexibility of the motor, and better protect the motor. In addition, in the overheating protection mode, the motor operates in a reduced current value. By reducing the current value of the motor, the loss of the motor is reduced so as to cool the motor. This prevents the motor from directly stopping when the temperature of the motor reaches the temperature protection point, so that the motor can still work under the overheating protection mode. Thus, the motor can be applied to a variety of environments, especially where the continuous operation of the motor is required, thereby improving the use flexibility of the motor, facilitating the use in different occasions, improving the application range of the motor, directly detecting the real-time temperature R of the motor, and adjusting the current value of the motor in real time through the change of the real-time temperature R, which can accurately achieve the overheating protection of the motor, and the motor can continue to operate under the overheating protection mode. The control method can avoid repeated starting and stopping of the motor near the temperature protection point, so as to better protect the motor and extend its service life.

The overheating protection method of the disclosure requires continuous detection of the real-time temperature R of the motor.

The given parameter P is speed or torque or power.

In the overheating protection mode, the current value I varies with the increase of the real-time temperature R according to the following equation: $I=I0(1-((R-Rm)/K))$, where K is a proportional constant in the range between $1.5\times(Rmax-Rm)$ and $2\times(Rmax-Rm)$.

In the overheating protection mode, when the real-time temperature R starts to decrease rather than increase, the current value no longer decreases, and the motor continues operation with the current value; when the real-time temperature R decreases to the recovery operation temperature Rmin, the motor quits the overheating protection mode, the current value recovers to the initial current value I0, and the motor runs under the given parameter P. This can effectively control the temperature rise of the motor, thus improving the service life of the motor in harsh environments, and can also prevent the motor from running at low power all the time, thus achieving the intelligent control of the motor.

In the overheating protection mode, the current value I is updated every a set interval T according to the real-time temperature R of the motor; when a temperature R0 corresponding to a last updated current value I is larger than an immediate real-time temperature R, and $R0-R>A$, where A is a set constant, for example, 5, which means the motor enters a cooling state, and the motor continues operation at the last updated current value I corresponding to the temperature R0 of the motor. The constant A and time T can be set according to the actual situation.

For example, suppose the given parameter P is power, and 310 VDC power supply is connected to the motor. When the power conversion efficiency is 0.85, the input power of the motor at initial start is 1800 W. At this power, the current value of the motor is about 5 A. According to the actual requirements of the user, the first threshold temperature Rmin is set as 75° C., the overheating protection temperature Rm as 100° C., the second threshold temperature Rmax as 125° C., and the proportional constant K is 50, the constant A is 5 and time T is 3 minutes.

In the beginning, when the current value of the motor decreases, the temperature of the motor is still in the rise state due to the continuous operation of the motor. The motor updates the current value I according to the current real-time temperature R every 3 minutes. Assuming that the current real-time temperature R is 120° C., the immediate current value I is calculated to be about 3 A according to the relationship: $I=I0(1-((R-Rm)/K))$. After another 3 minutes, the temperature of the motor is recorded. The last updated real-time temperature R of 120° C. is recorded as R0. If the current real-time temperature R is 110° C., that is, the last updated real-time temperature R0 of the motor corresponding to the current value I is greater than the current real-time temperature R of the motor, and $R0-R>5$, indicating that the motor is in a cooling state. And then, the current value of the motor will not decrease any more, and the motor continues operation with the current value I (i.e. 3 A) corresponding to the last updated real-time temperature R0 (i.e. 120° C.) of the motor.

As shown in FIG. 5, during operation, the motor can be cooled by continuously lowering the current limit or stopping operation.

When the real-time temperature R meets the condition: $Rmin<R<Rm$, the working mode of the motor is determined; when the motor runs in an overheating protection mode, the current value of the motor continues decreasing; when the motor runs in a shutdown model, the motor stops running until the real-time temperature R decreases to the recovery operation temperature Rmin, and the motor restarts. The operation is used to distinguish the following situations: when the real-time temperature R meets the conditions: $Rmin<R<Rm$, it is caused by the temperature rise due to the normal operation of the motor after the motor is started up or by the use of a protection mode to reduce the temperature after the temperature is too high. The motor executes the current control command according to the judgment result thus avoiding the wrong execution of the control command. The compound operation logic can better protect the motor, and extend the service life of the motor.

When the motor enters the overheating protection mode and the current value of the motor is continuously reduced, if the real-time temperature R of the motor continues rising, and when the real-time temperature R is equal to or greater than the shutdown temperature Rmax, the motor enters the shutdown state, and stops working. In the shutdown state, the motor continues to cool with the time passing by, and the real-time temperature R of the motor continues to drop, until the real-time temperature R drops to the recovery operation temperature Rmin, and the current value recovers to the initial current value I0. The motor restarts with the given parameter P set by the user, which can avoid the failure of reducing the motor temperature through reducing the current value, prevent the motor from being damaged due to the continuous temperature rise, effectively control the motor temperature, and extend the service life of the motor in harsh service environment (such as high temperature working environment). Moreover, under the protection mode, the motor will not start again until the real-time temperature R drops to the recovery operation temperature Rmin, which can avoid repeated starting and stopping of the motor. The design is reasonable, and expands the scope of application of the motor, improves the use flexibility of motor, and better protect the motor.

At the initial startup, when the real-time temperature R is less than the overheating protection temperature Rm, the motor operates normally with the initial current value I0, which conforms to the control logic of the motor.

At the initial startup, when the real-time temperature R is equal to or greater than the shutdown temperature Rmax, the motor enters the shutdown state, and stops working. In the shutdown state, the motor continues to cool with the time passing by, and the real-time temperature R of the motor continues to drop, until the real-time temperature R drops to the recovery operation temperature Rmin, and the current value recovers to the initial current value I0. The motor restarts with the given parameter P set by the user, which can avoid the motor from being damaged due to the high temperature when initial startup, and ensure that the motor cannot be started normally under high temperature, so as to extend the service life of the motor under harsh service environment (such as high temperature working environment).

Specifically, as shown in FIG. 6, the method for protecting a motor from overheating is detailed as follows:

1) when the motor starts, if the real-time temperature is R<Rmin or R<Rm, the motor runs in the initial current value I0;
2) during running, if the real-time temperature is Rm<R<Rmax, the motor enters the overheating protection mode, and runs in a current value I lower than the initial current value I0, and the current value I decreases with the increase of the real-time temperature R;
3) during running, if the real-time temperature is R>Rmax, the motor stops running until the real-time temperature R decreases to the recovery operation temperature Rmin, and the motor restarts running under the initial current value I0 in the given parameter P;
4) during running, if the real-time temperature is Rmin<R<Rm, determining whether the motor runs in an overheating protection mode, if so, the current value continues decrease, if not, to proceed 5); and
5) determining whether the motor is in a shutdown model, if so, allowing the motor to continue resting until the real-time temperature R decreases to the recovery operation temperature Rmin, and then the motor restarts; if not, allowing the motor to run in the initial current value I0.

For purpose of understanding, the following example is provided for the above method: suppose the given parameter P is power, and 310 VDC power supply is connected to the motor. When the power conversion efficiency is 0.85, the input power of the motor at initial start is 1800 W. At this power, the current value of the motor is about 5 A. According to the actual requirements of the user, the first threshold temperature Rmin is set as 75° C., the overheating protection temperature Rm as 100° C., the second threshold temperature Rmax as 125° C., and the proportional constant K is 50, the constant A is 5 and time T is 3 minutes.

At the initial start, the real time temperature R of the motor is less than 75° C. or 100° C., the motor starts normally and operates at 1800 W. At this time, the current limit of the motor is 5 A. If the real-time temperature R of the motor is greater than or equal to 125° C., the motor cannot be started normally and remains in the shutdown state. The motor cannot be started normally until the real-time temperature R is less than 75° C. and operates at 1800 W. In the time being, the current value of the motor is 5 A.

When the motor starts normally, and the temperature of the motor continues rising, if the real-time temperature R of the motor is between 75° C. and 100° C., and the motor is still running at 1800 W power, the current value of the motor is still 5 A. When the real-time temperature R of the motor is greater than or equal to 100° C., the motor enters the overheating protection mode and the current value begins to decrease. At this time, the motor is still running. The current value of the motor decreases with the increase of the real-time temperature R of the motor. The current value I is calculated according to the formula: I=5×(1−((R−100)/50)), the value range of the real-time temperature R is 100<R<125, and the motor loss is reduced by reducing the current value of the motor thus achieving the purpose of cooling the motor. When the current value of the motor is just reduced, the motor is still in the heating state due to the continuous operation. The motor updates the current value I according to the current real-time temperature R every 3 minutes. Assuming that the current real-time temperature R is 120° C., the current current value I can be calculated to be about 3 A. After 3 minutes, the motor temperature is recorded again, and the current real-time temperature R recorded last time is 120° C. as R0. If the current real-time temperature R is 110° C., that is, the real-time temperature R0 of the motor recorded when the current value I was last updated is greater than the current real-time temperature R of the motor, and R0−R>5, indicating that the motor has entered the cooling state. And then, the current value of the motor will not decrease, and the motor continues running with the current value I (i.e. 3 A) corresponding to the last recorded real-time temperature R0 (i.e. 120° C.) until the real-time temperature R is less than 75° C. Thereafter, the motor exits the overheating protection mode, restores the current value from 3 A to 5 A and continues to operate at 1800 W.

Understandably, in some harsh environments (such as high temperature environment), even if the current value of the motor is reduced, the temperature of the motor will continue to rise. In this case, if the current value of the motor decreases, the temperature of the motor continues to rise until the real-time temperature R of the motor is greater than or equal to 125° C. At this time, the motor directly enters the shutdown protection mode. The motor cannot be started again until the real-time temperature R is less than 75° C. The motor restarts at 1800 W, and the current limit is 5 A.

It will be obvious to those skilled in the art that changes and modifications may be made, and therefore, the aim in the appended claims is to cover all such changes and modifications.

The invention claimed is:

1. A method for protecting a motor from overheating, the method comprising:
1) running the motor in a given parameter P and detecting a real-time temperature R of the motor;
2) comparing the real-time temperature R with a plurality of set temperatures, the plurality of set temperatures comprising an overheating protection temperature Rm, a shutdown temperature Rmax and a recovery operation temperature Rmin, and Rmin<Rm<Rmax;
3) according to a comparison result in 2), controlling the motor to operate at an initial current value I0, or operate in a reduced current value with respect to the initial current value I0, or stop running; and
4) when the real-time temperature R meets the condition: Rm<R<Rmax, running the motor in an overheating protection mode, where the motor operates at a current value I lower than the initial current value I0, and the current value I decreases with an increase of the real-time temperature R; and in the overheating protection mode, when the real-time temperature R begins to decrease, the current value I no longer decreases and the motor continues to operate at the current value I; when the real-time temperature R decreases to the recovery operation temperature Rmin, the motor quits the overheating protection mode, the current value recovers to the initial current value I0, and the motor runs under the given parameter P.

2. The method of claim 1, wherein in the overheating protection mode, the current value I varies with the increase of the real-time temperature R according to the following equation: I=I0(1−((R−Rm)/K)), where K is a proportional constant in the range between 1.5×(Rmax−Rm) and 2×(Rmax−Rm).

3. The method of claim 2, wherein in the overheating protection mode, the current value I is updated every a set interval T according to the real-time temperature R of the motor; when a temperature R0 corresponding to a last updated current value I is larger than an immediate real-time temperature R, and R0−R>A, where A is a set constant, which means the motor enters a cooling state, and the motor continues operation at the last updated current value I corresponding to the temperature R0 of the motor.

4. The method of claim 3, wherein when the real-time temperature R meets the condition: Rmin<R<Rm, a working mode of the motor is determined; when the motor runs in an overheating protection mode, the current value of the motor continues decreasing; when the motor runs in a shutdown model, the motor stops running until the real-time temperature R decreases to the recovery operation temperature Rmin, and the motor restarts.

5. The method of claim 4, wherein when the real-time temperature R is greater than or equal to the shutdown temperature Rmax, the motor enters the shutdown model and stops running.

6. The method of claim 5, wherein when the motor stops running, the motor cools down continuously with the time passing by, and the real-time temperature R of the motor decreases continuously, until to the recovery operation temperature Rmin, the current value recovers to the initial current value I0, and the motor restarts to run under the given parameter P.

7. The method of claim 1, wherein at initial startup, when the real-time temperature R is less than the overheating protection temperature Rm, the motor operates normally with the initial current value I0.

8. The method of claim 1, wherein:
1) When the motor starts, if the real-time temperature is R<Rmin or R<Rm, the motor runs in the initial current value I0;
2) During running, if the real-time temperature is Rm<R<Rmax, the motor enters the overheating protection mode, and runs in a current value I lower than the initial current value I0, and the current value I decreases with the increase of the real-time temperature R;
3) during running, if the real-time temperature is R>Rmax, the motor stops running until the real-time temperature R decreases to the recovery operation temperature Rmin, and the motor restarts running under the initial current value I0 in the given parameter P;
4) During running, if the real-time temperature is Rmin<R<Rm, determining whether the motor runs in an overheating protection mode, if so, the current value continues decrease, if not, to proceed 5); and
5) Determining whether the motor is in a shutdown model, if so, allowing the motor to continue resting until the real-time temperature R decreases to the recovery operation temperature Rmin, and then the motor restarts; if not, allowing the motor to run in the initial current value I0.

9. The method of claim 1, wherein the given parameter P is speed or torque or power.

10. The method of claim 1, wherein the motor comprises a motor body, a motor controller, and a temperature detection unit; the motor body comprises a stator assembly and a rotor assembly; the motor controller comprises a control circuit board; the control circuit board comprises a power supply circuit, a motor microprocessor MCU, and an inverter circuit; the power supply circuit supplies power for all circuits, and the motor microprocessor MCU controls the inverter circuit; the inverter circuit controls power on and power off of a coil winding of each phase of the stator assembly thus controlling the motor body; the temperature detection unit is used to detect the real-time temperature R inside the motor body and transmit a detection result to the motor microprocessor MCU; the motor microprocessor MCU compares the real-time temperature R with the plurality of set temperatures so that the motor determines to operate normally with the initial current value I0, or operate in a reduced current value with respect to the initial current value I0, or stop running according to the comparison result.

\* \* \* \* \*